US006531066B1

(12) United States Patent
Saunders et al.

(10) Patent No.: US 6,531,066 B1
(45) Date of Patent: Mar. 11, 2003

(54) CYCLONE SEPARATOR

(75) Inventors: David Henry Saunders, Olney (GB); Emil Gyorgy Arato, Bedford (GB); Owen Matthew Davies, Milton Keynes (GB)

(73) Assignee: B.H.R. Group Limited (GB)

( * ) Notice: Subject to any disclaimer, the term of this patent is extended or adjusted under 35 U.S.C. 154(b) by 0 days.

(21) Appl. No.: 09/530,849

(22) PCT Filed: Nov. 4, 1998

(86) PCT No.: PCT/GB98/03303

§ 371 (c)(1), (2), (4) Date: Aug. 3, 2000

(87) PCT Pub. No.: WO99/22874

PCT Pub. Date: May 14, 1999

(30) Foreign Application Priority Data

Nov. 4, 1997 (GB) ............................................ 9723341
Aug. 5, 1998 (GB) ............................................ 9817071

(51) Int. Cl.[7] ............................................ B01D 17/038

(52) U.S. Cl. ........................ 210/787; 55/426; 55/459.1; 55/DIG. 3; 95/269; 15/353; 210/512.1; 210/512.3

(58) Field of Search .............................. 15/353; 55/337, 55/345, 424, 426, 429, 459.1, DIG. 2, DIG. 3; 210/304, 512.1, 512.3, 787, 788; 95/269, 270, 271

(56) References Cited

U.S. PATENT DOCUMENTS 22,334 A 12/1858 Stern
2,542,635 A 2/1951 Davis et al.
2,698,672 A 1/1955 Burnside et al.
2,837,172 A 6/1958 Klein
3,481,118 A 12/1969 Willis
3,771,290 A * 11/1973 Stetham ................... 210/512.1
4,246,013 A 1/1981 Truhan et al.
4,251,241 A 2/1981 Bothun
4,305,825 A 12/1981 Laval, Jr.
4,334,986 A 6/1982 Frykhult
4,378,234 A 3/1983 Suzuki et al.
4,581,050 A 4/1986 Krantz
4,643,748 A 2/1987 Dyson
5,062,870 A 11/1991 Dyson
5,078,761 A 1/1992 Dyson
5,080,697 A 1/1992 Finke
5,090,976 A 2/1992 Dyson
5,135,552 A 8/1992 Weistra
5,137,554 A 8/1992 Carter
5,160,356 A 11/1992 Dyson
5,558,697 A 9/1996 Dyson et al.

FOREIGN PATENT DOCUMENTS

DE 2946572 5/1981
DE 3936078 5/1991
EP 042723 5/1981

(List continued on next page.)

*Primary Examiner*—Joseph W. Drodge
(74) *Attorney, Agent, or Firm*—Blakely Sokoloff Taylor & Zafman

(57) ABSTRACT

The present invention provides a reverse flow cyclone separator including a container closed at one end, a component for introducing a fluid mixture swirling about an-axis at a region of the container remote from said end, a barrier between said region and said end, the barrier having a surface facing the introducing component and extending towards the outer wall of the container leaving a gap therebetween, and an outlet for lighter phases of the mixture, the outlet opening from the region, the barrier having an outer perimeter which extends in the axial direction a distance not less than the radial extent of the gap. Since the outlet opens from the region, the flow of fluid from the fluid introducing component to the outlet is not obstructed by the barrier and does not pass through the gap.

45 Claims, 4 Drawing Sheets

FOREIGN PATENT DOCUMENTS

| | | |
|---|---|---|
| EP | 430647 | 6/1991 |
| EP | 461004 | 12/1991 |
| EP | 489565 | 6/1992 |
| EP | 626338 | 1/1995 |
| EP | 0636338 | 2/1995 |
| FR | 1274656 | 2/1962 |
| FR | 2174912 | 10/1973 |
| GB | 469539 | 7/1937 |
| GB | 2137906 | 10/1984 |
| GB | 2271728 | 4/1994 |
| GB | 2132511 | 7/1994 |
| GB | 2295311 | 5/1996 |
| GB | 2296206 | 6/1996 |
| GB | 2296452 | 7/1996 |
| GB | 2296879 | 7/1996 |
| GB | 2297243 | 7/1996 |
| NL | 6609457 | 1/1967 |
| RU | 1805908 | 1/1991 |
| RU | 2034513 | 5/1991 |
| RU | 465949 | 11/1991 |
| RU | 1764625 | 9/1992 |
| WO | WO93/09875 | 5/1993 |
| WO | WO95/10972 | 4/1995 |
| WO | WO95 25584 | 9/1995 |
| WO | WO96/19294 | 6/1996 |
| WO | WO97/09122 | 3/1997 |

* cited by examiner

CYCLONE SEPARATOR

FIELD OF THE INVENTION

The present invention provides a reverse flow cyclone separator. The present invention has particular applicability in domestic vacuum cleaners, where dust and other debris are separated from air, although phase separation of other materials including separation of two liquids is envisaged.

BACKGROUND OF THE INVENTION

In a cyclone separator, a fluid mixture is swirled in a container which swirling motion causes the heavier components of the mixture to move preferentially to the outer region and the lighter components to move to the inner region. By supporting a flange centrally across the container leaving a gap between it and the outer wall, the components can be separated because the heavier components pass through the gap while the lighter components at the smaller radii are constrained by the flange. There is a problem however that the swirling lighter components may pick up heavier components after they have been separated if the flange and gap do not present a sufficient barrier. This leads to inefficiency in the separation process and may also clog filters or other screens located downstream of the container.

SUMMARY OF THE INVENTION

The present invention provides a reverse flow cyclone separator comprising a container closed at one end, means for introducing a fluid mixture swirling about an axis at a region of the container remote from said end, barrier means between said region and said end, the barrier means having a surface facing said introducing means and extending towards the outer wall of the container leaving a gap therebetween, and an outlet for lighter phases of the mixture, the outlet opening from said region, the barrier means having an outer perimeter which extends in the axial direction a distance not less than the radial extent of said gap. Since the outlet opens from said region, the flow of fluid from the fluid introducing means to the outlet is not obstructed by the barrier and does not pass through the gap.

The barrier means may have a solid outer perimeter which is continuous in said axial direction; in a less preferred alternative the means may comprise a plurality of separated barriers spanning an axial distance not less than the radial extent of said gap. If the barriers are of different radial extents, the gap is measured to the barrier of largest radial extent. The barrier or barriers may be perforated. At least one of the barriers may be a curved or angled plate. We have found that barrier means of or above this minimum axial extent provide efficient separation since little momentum exchange takes place across the barrier means. In absolute terms the separator will only separate out particles which are smaller than the width of the gap.

The barrier means is preferably mounted on a member which itself is mounted separately within the container and is closed off from fluid communication with said container. This member preferably extends throughout said region and may extend throughout said container. The member is preferably hollow and connected to receive relatively heavier phase components from a further separator connected to said outlet. The member preferably has a radius no more than 50% of the radius of the container when the latter is of circular section, and preferably less than 10%. One or both of the container and the body is/are preferably cylindrical.

The outlet is preferably an annulus arranged around the member, whose radial width is between 5% and 50% of the radius of the member when cylindrical.

The lower portion of the container is preferably removable from the upper portion, so that it can be emptied of heavier phases in use. The container is preferably splitable between the portions about a plane below the barrier means. When the member is provided, the member is preferably splitable as well, and preferably about the same plane. The lower portions of the container and of the member are preferably integral.

Axially extending additional barrier(s) may be provided, sealed to said end of the container. The axial extent is preferably at least 10% of the diameter of the container at its closed end. The gap between the wall of the container and the or the outer barrier is preferably between 5% and 25% of the diameter of the container at its closed end.

The means for introducing the fluid mixture swirling about an axis is preferably arranged tangentially to the container and this tangential arrangement may be in the form of an involute. The involute may have an upstream radius which is between 30% and 300% larger than the downstream radius and preferably between 50% and 200%. The involute may comprise a series of segments (preferably at least three) of decreasing radius towards the container, the centres of the segments being arranged to produce a smooth transition from one segment to the next.

The outlet of lighter phases of the mixture preferably comprises a foraminated screen leading to an annular chamber surrounding said member. This screen is preferably frusto-conical, tapering outwardly in the downstream direction from the radius of said member to which it is sealed at its narrow end. The axial length of the screen is preferably between 50% and 150% of the outer diameter of the annular outlet duct. The screen preferably has a clear area of between 30% and 70% of its surface area.

The present invention has particular applicability in domestic vacuum cleaners, where dust and other debris are separated from air, although phase separation of other materials including separation of two liquids is envisaged.

BRIEF DESCRIPTION OF THE DRAWINGS

Examples of the invention will now be described with reference to the accompanying drawings, in which.

DETAILED DESCRIPTION

Figure 1:
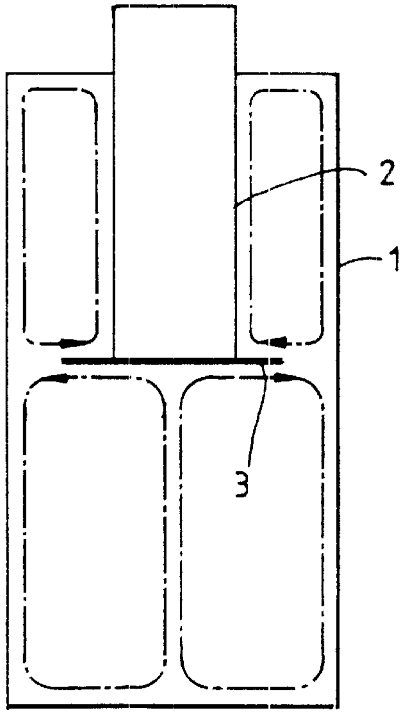
FIG. 1 shows secondary flow patterns in a conventional reverse flow cyclone provided with a barrier.

In FIG. 1 a cylindrical container 1 contains an inner cylinder 2 having a flange 3 extending outwardly for about half the distance to the wall of the container 1. In this arrangement the inner cylinder extends throughout the region above the flange, but does not extend below it. There is therefore an annular compartment above the flange and a cylindrical compartment below it.

A fluid-based mixture is introduced into the annular chamber of the container 1 with a swirling motion carried by the involute shape of the duct leading into the container so that the mixture rotates around the inner cylinder 2. Heavier components in the mixture tend to move to the outer regions of the cylindrical container 1 due to the swirling motion and tend to separate out and move by diffusion and under gravity passing the flange 3 to enter the cylindrical compartment and come to rest on the bottom of the container 1. The lighter components remain in the annular compartment which they leave by means not shown in this Figure.

The swirling primary flow generates secondary flows. FIG. 1 shows by dotted closed curves the secondary flow patterns in the fluid mixture. Above the flange 3, the flow tends to be downwards at the outer region of the cylindrical container 1 and upwards close to the wall of the inner cylinder 2 so that immediately above the flange 3 the flow tends to be radially inwards. Below the flange 3, the radial flows are reversed, being outwards from the axis towards the outer wall. The flange 3 is a plate of insubstantial thickness so that the opposing radial flows are little separated and momentum exchange takes place through the gap around the periphery of the flange. The heavier components of the mixture which in the region of the flange 3 are moving more slowly may, through this interchange of momentum, be given additional velocity so that instead of coming to rest on the bottom of the container 1 they may become re-entrained with the lighter components in the annular compartment and be carried together out of the container 1. It will be seen that the secondary flows are upwards in the middle of the container 1, tending to lift the denser components from their resting place in the bottom of the container 1. The separator is thus inefficient in that much of the initial separation of components has been reversed. Without a flange 3 at all, the secondary flow patterns would extend continuously between top and bottom of the container 1 and the denser components will almost certainly remain entrained with the lighter components.

Figure 2:
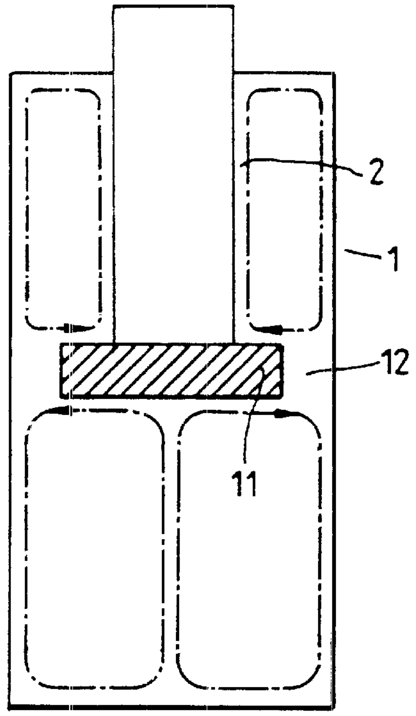
FIGS. 2 to 5 show secondary flow patterns in reverse flow cyclones embodying the present invention.

When FIG. 2 is contrasted with FIG. 1, it will be seen that the axial extent of the flange 11 has been considerably increased, to a value at least as great as the radial extent of the gap 12. The flange 11 is no longer a thin plate, but is a large solid body whose axial extent is slightly greater than the radial extent of the gap 12 between the perimeter of the flange 11 and the outer wall of the cylindrical container 1. The reverse radial flows above and below the flange 11 are now well separated so that much less momentum exchange takes place across the gap and any tendency to reverse the separation of components is much reduced. The strength of the secondary flows is also reduced. There is less risk that a heavier component can escape upwards past the barrier through the gap 12. The efficiency of the separator is thus increased because separated heavier components are not re-entrained with the lighter components and more of them will come to rest at the bottom of the container 1. Good dust separation has been achieved with a 15 mm gap between the baffle 24 and the sidewall of the container and an axial extent of the baffle rim of 20 mm, a ratio of 4:3 baffle axial extent to radial extent. Increasing the axial extent to 40 mm, a ratio of 8:3, improves separation. Decreasing the gap to 10 mm also improves performance, but also increases the risk of the gap becoming blocked by large particles. The best combination of good separation without blockages indicates the 4:3 ratio to be optimum.

Figure 3:
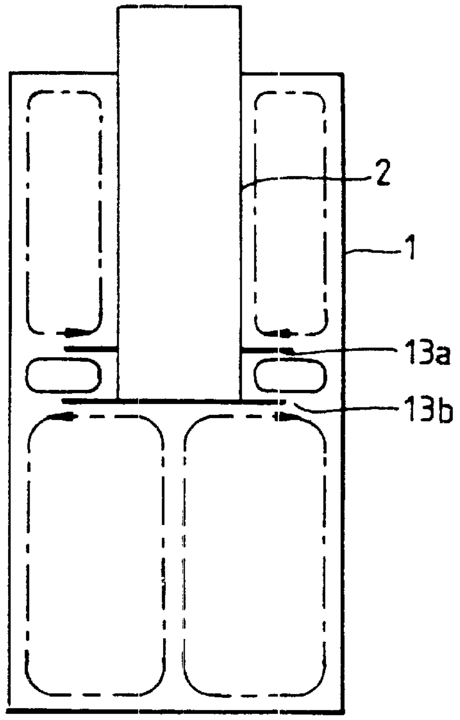

If a large solid flange 11 is to be avoided for reasons such as economy in weight or cost, then a flange assembly comprising two separated plates 13*a*, 13*b* may be provided, as shown in FIG. 3. Although there may be a minor flow pattern established between the flanges 13*a*, 13*b*, the chance of momentum exchange taking place across one flange and then again across the other flange to the same heavier component in the mixture is much reduced compared with the probability of exchange in FIG. 1 and so the efficiency of separation is increased. The flange assembly may comprise more than two flange plates 13*a*,13*b*.

Figure 4:
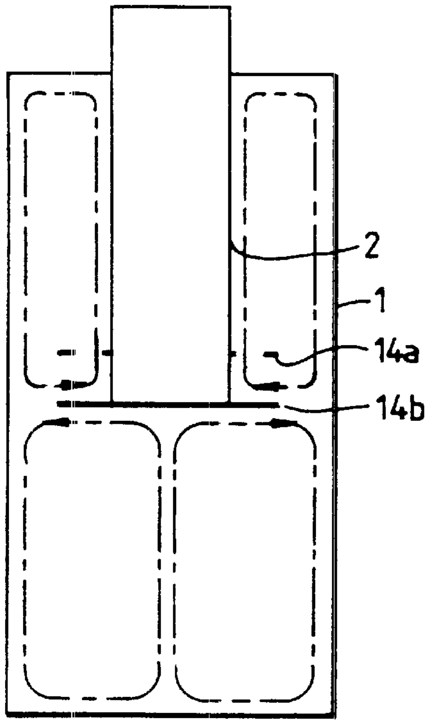

FIG. 4 shows a flange assembly comprising two flange plates 14*a*, 14*b*, the upper one of which is perforated. Although the flow pattern in the upper portion of the container 1 now extends to the region immediately above the lower flange plate 14*b*, the momentum is much reduced by passage through the perforations of the upper plate 14*a*, thus reducing the momentum exchange which occurs in FIG. 1 where no such upper perforated flange plate 3 is provided.

Figure 5:
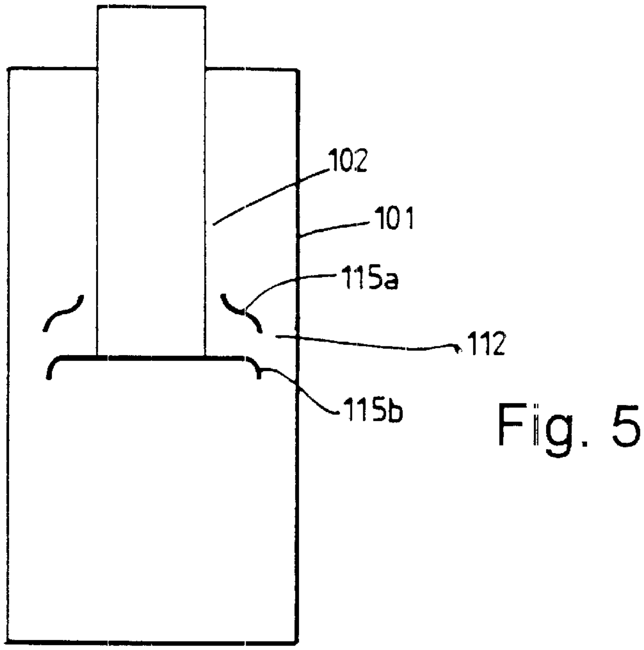

It is not necessary for the flange plates to be plane discs. They may be provided with a partial or complete conical shape. FIG. 5 shows an upper flange plate 15*a* of ogee shape and a lower flange plate 15*b* which is plane except for an outer rim which is a figure of revolution of a quarter-arc of a circle. The outer peripheries of the two plates 15*a*, 15*b* are at approximately the same radial distance from the axis of the container 1 and the axial distance between the peripheral regions of the two plates 15*a*, 15*b* is greater than the radial extent of the gap 12 between their peripheries and the outer wall of the cylindrical container 1. The flow patterns have not been illustrated in FIG. 5, but will be similar to those in FIG. 4 and the increase in efficiency compared to the arrangement of FIG. 1 will be similar.

Figure 6:
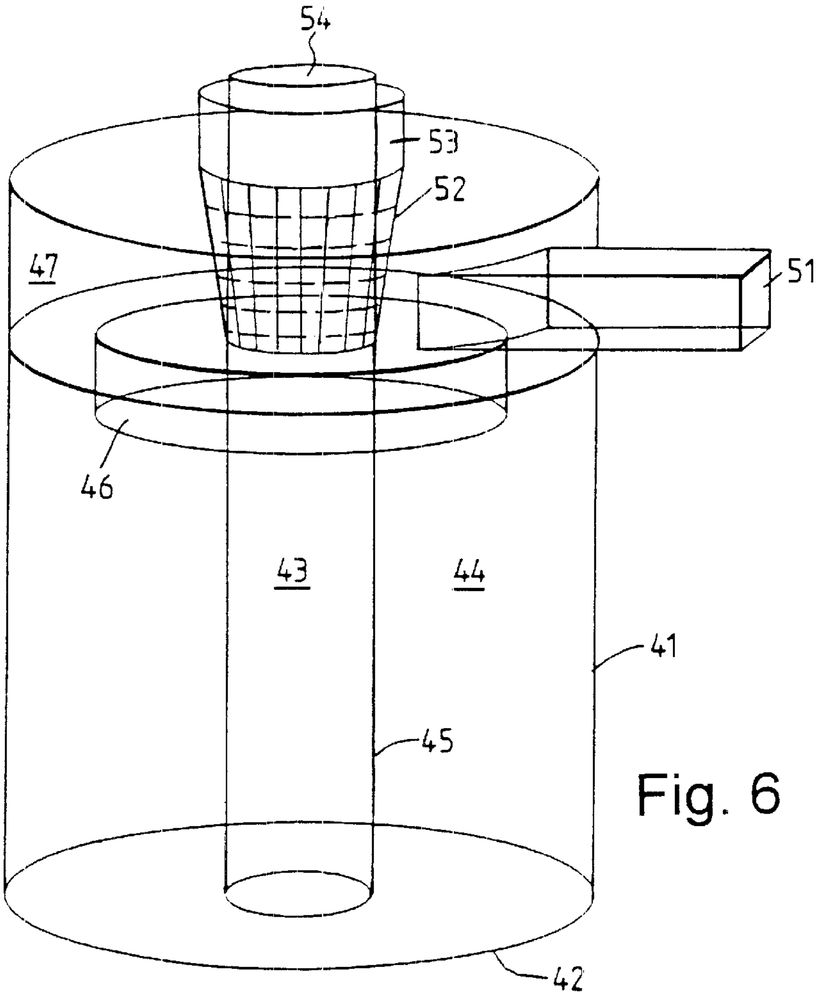
FIG. 6 illustrates the inlet and outlet conduits for a cyclone embodying the invention.

FIG. 6 shows in greater detail a reverse flow cyclone separator embodying the invention. A cylindrical container 41 closed at its lower end 42 is divided into an inner cylindrical compartment 43 and an outer annular compartment 44 by a hollow axial tube 45. The present embodiment is concerned with the annular chamber 44 and not the chamber 43. An annular baffle 46 is mounted on the tube 45 with its upper surface at a height of between 75% and 80% of the total height of the container. Contrary to FIGS. 1 to 5, the tube 45 extends past the flange baffle to 46 right to the bottom of the container 41. In common with FIGS. 1 to 5 the interior of the tube 45 is closed off from the compartment 44. The periphery of the baffle defines with the outer wall of the container 41 a gap whose radial extent is no greater than the axial depth of the baffle which in this embodiment is solid.

The baffle 46 divides the compartment 44 into an upper chamber, called the separation chamber 47, and the lower chamber 44 called the collection chamber. An approximately tangential inlet 51 feeds the phase mixture into the separation chamber approximately tangentially so that the phase mixture swirls around the axis of the container, the heavier phases tending to remain at greater radii within the chamber and the lighter phases tending to move towards the inner radii. In a true tangential inlet, one wall of the inlet conduit is tangential to the cylindrical wall of the container 41. The swirling action can be achieved when the inlet conduit 51 is only approximately tangential, in which the wall of the conduit is inclined to the true tangent by a small angle, and the inlet conduit could be in the form of a involute whose curvature increases from the curvature of the cylinder at the junction with the cylinder, the curvature increasing with increased distance from the cylinder. The increase of curvature may be continuous, although in practice it may increase in steps for ease of manufacture.

The heavier phases of the mixture fall by gravity through the gap between the baffle and the wall of the container 41 to be collected in the annular collection chamber and the lighter phases leave the separation chamber through a frusto-conical shroud 52 arranged around the cylindrical tube 45. The lower end of the shroud 52 has the same radius as the cylindrical tube and tapers outwardly to the top of the container thus defining with the tube 45 an annular chamber of increasing radius. The chamber is continued at 53 outside the top of the container with uniform outer radius from which a tangential outlet 54 extends to feed the lighter phases for further processing in apparatus not forming part of this invention. The junction between the frusto-conical shroud 52 and the uniform radius portion 53 forming the outlet duct occurs at the top end of the container 41. In an alternative form of the invention the uniform radius portion 53 may extend into the container by up to five times the diameter of the duct.

The container 41 and the tube 45 are divided at a transverse plane at the level of the bottom of the baffle. In operation, the respective parts of the container and tube are held together at the split plane by fluid-tight clamps (not shown). These clamps are released to empty the matter collected in the base of the container. The apparatus divides completely at a plane so that it is easy to remove the lower portion for emptying without knocking the upper part (which might cause matter lodged in the upper part to fall out). Although FIG. 6 shows the split plane intersecting the baffle 24, it is preferred that this plane lies just below the baffle 24, so that the rim of the lower portion is less likely to knock against the baffle 24 when it is removed.

The frusto-conical shroud 52 defines with the cylindrical tube 45 a chamber whose radius increases steadily towards the top of the container 41, thus ensuring substantial constant velocity in the chamber as fluid which has passed through the shroud moves towards the top of the chamber, flow which extends through the screen over the full height of the separation chamber without reverse flow or recirculation. This provides high separation efficiency and low pressure losses.

Figure 7:
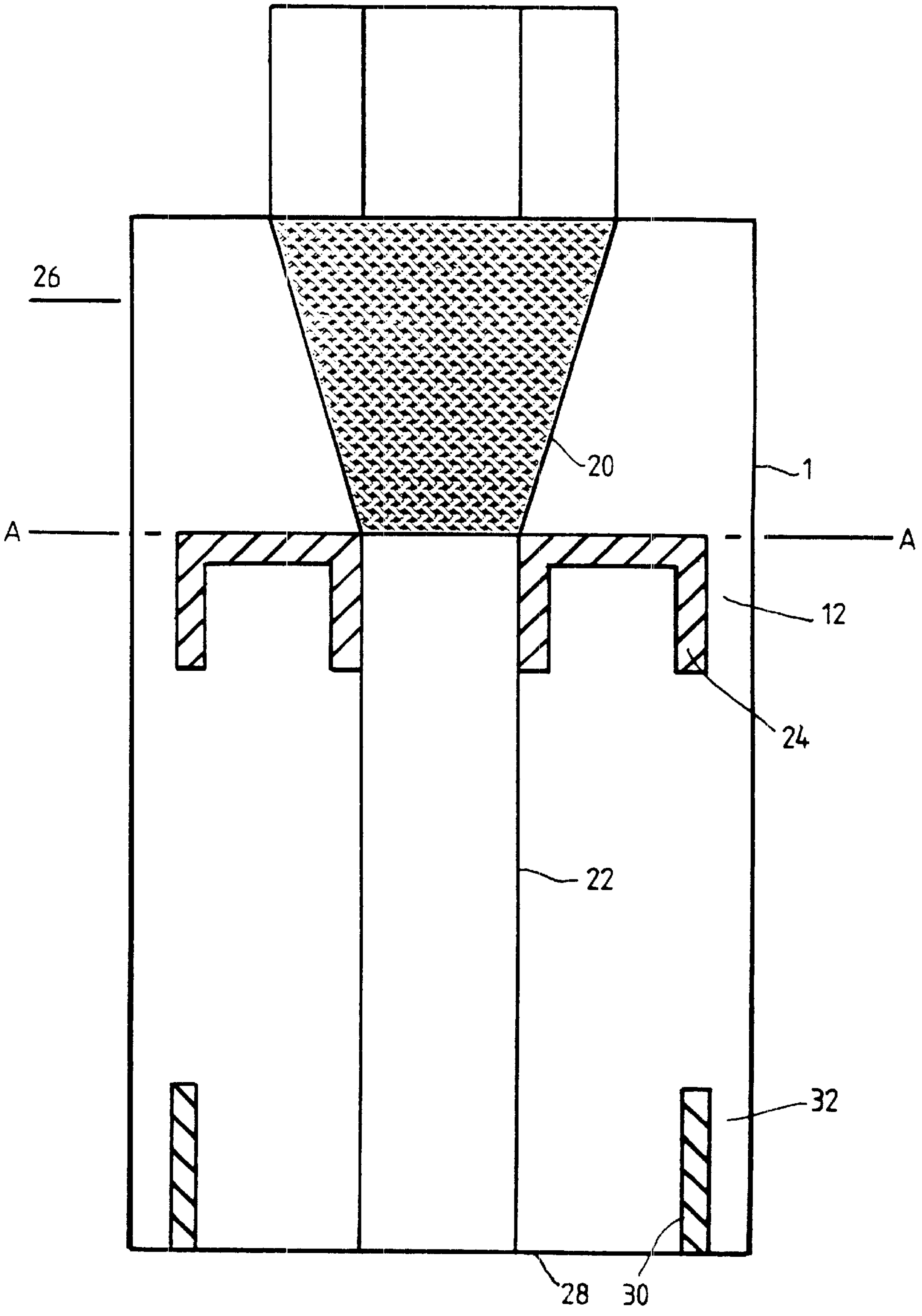
FIGS. 7 and 8 show cross-sectional views below line A—A of a reverse flow cyclone having an additional baffle or baffles.

FIG. 7 shows an alternative baffle 24 which is an undercut solid disc, the undercut having the effect of forming the baffle as an annulus generated by rotating an inverted-U about an axis spaced from and parallel to its side arms. Undercutting may be useful to save weight or to save material but does not materially affect performance. The important factor is the relationship of the axial extent of the outer wall of the baffle and its separation from the wall of the cylindrical container.

An additional baffle 30 is provided on the base 28 of the cylinder as an upstanding coaxial ring, spaced apart from the sidewall of the container by a gap 32. The baffle 30 provides support, both in the gap 32 and inside itself for heavier phases collected, and so discourages those heavier phases from being re-entrained with the lighter phases.

Figure 8:
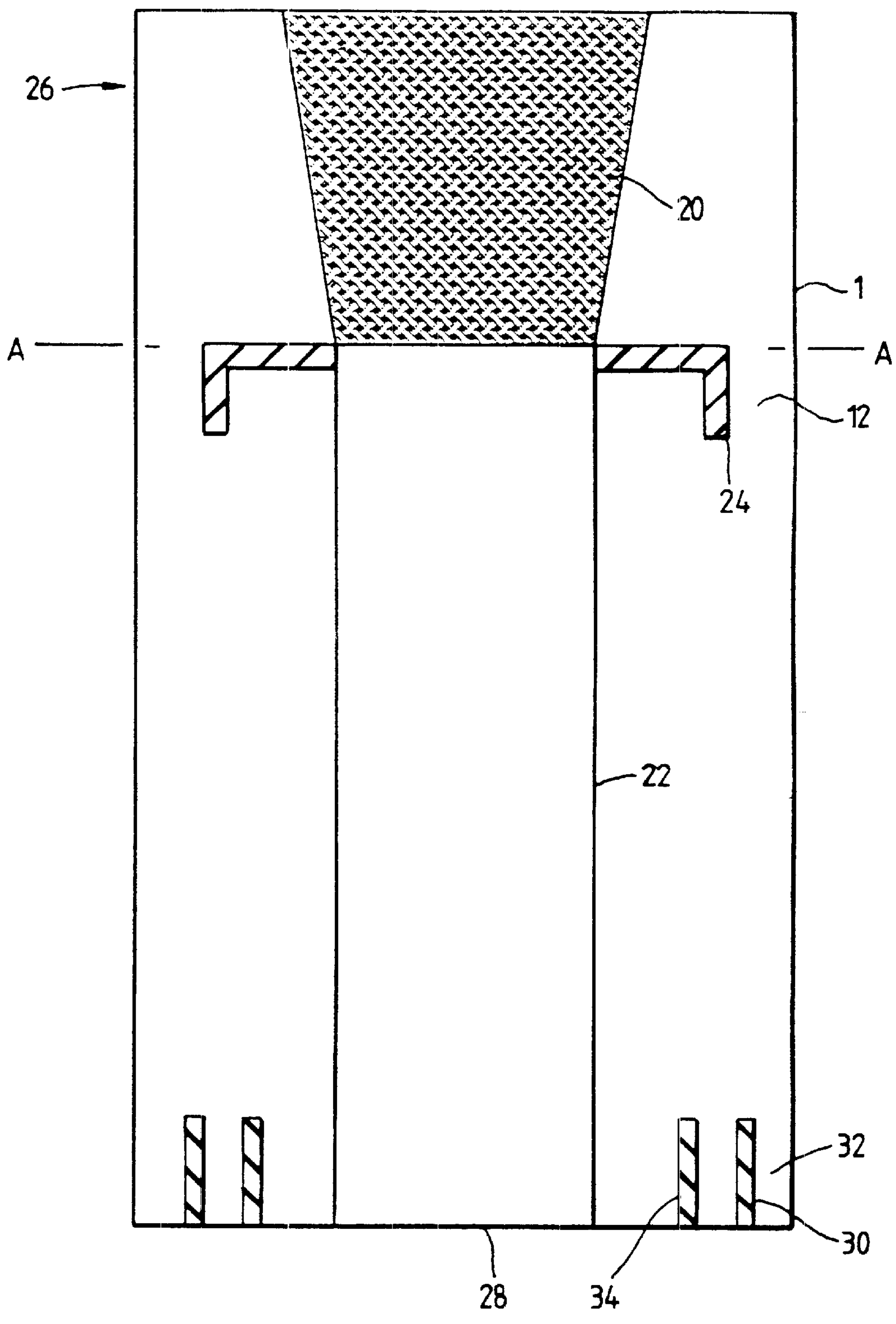

FIG. 8 shows a variation of the FIG. 7 embodiment, where a second baffle 34 is provided on the base of the container as well as the first baffle 30. Further such baffles may be provided extending axially from the base of the container.

The baffle or baffles 30, 34 may not extend in a direction parallel to the axis of the container 1. For example, the baffle or baffles could be arranged so as to provide a tapered gap between the baffle and the sidewall of container 1, or between respective baffles.

Optionally, a yet further baffle (not shown) could be added between the flange 24 and the lower baffles 30, 34. This additional baffle could have the form of a ring mounted around the lower cylinder 22.

Although the baffle 24 defines the lower edge of the separation chamber 47, it is pointed out that none of the baffles 24, 30 and 32 obstructs the flow of the fluid between the inlet 51 and the outlet 54.

In FIG. 7, the main baffle 24 is undercut completely to the central cylinder 22, so that the inverted U-shape of the baffle of FIG. 6 has become an inverted L-shape. The outer rims of the baffles 24 of FIGS. 6 and 7 are however similar.

This invention may be applied to separating any combinations of flow components (solid, liquid, gas) and multiphase flows. The combination may be of more than two flow components of any one phase, such as water and oil and this combination may be further combined with a gas and solid particles such as sand.

What is claimed is:

1. A reverse cyclone separator including:

a container closed at one end;

an inlet for introducing a fluid mixture swirling about an axis at a region of the container remote from the end;

an outlet for lighter phase of the mixture, the outlet opening from the region;

a member mounted centrally within the container, the member being closed off from fluid communication with the container; and a barrier mounted around the member and in a fluid flow path between the region and the closed end, the barrier having a surface facing the inlet and extending towards the outer wall of the container leaving a gap therebetween, and having an outer perimeter which extends in the axial direction a distance not less than the radial extent of the gap;

wherein the outlet comprises a chamber formed by the member and a foraminated shroud mounted around the member, the width of the chamber increasing with distance from the barrier, the arrangement being such that in use fluid flows with substantially constant velocity in the chamber.

2. A reverse flow cyclone separator according to claim 1, wherein the barrier has a solid outer perimeter which is continuous in the axial direction.

3. A reverse flow cyclone separator according to claim 1, wherein the barrier comprises a plurality of separated barriers spanning an axial distance not less than the radial extent of the gap.

4. A separator as claimed in claim 1, wherein the member is hollow and is connected to receive relatively heavier phase components from a farther separator connected to the outlet.

5. A reverse flow cyclone according to claim 1, comprising a further barrier adjacent the bottom end of the container extending generally in the axial direction.

6. A reverse flow cyclone according to claim 5, wherein the further barrier comprises two or more spaced apart walls, the walls being spaced apart from an edge of the container.

7. A reverse flow cyclone separator according to claim 1, wherein the member has a radius less than 10% of the radius of the container, when the latter is of circular cross-section.

8. A reverse flow cyclone separator according to claim 1, wherein a lower portion of the container is removable from an upper portion, the split being about a plane below the barrier.

9. A reverse flow cyclone separator according to claim 1, wherein the shroud is frusto-conical.

10. A reverse flow cyclone separator according to claim 1, wherein a lower end of the shroud has the same radius as the member and tapers outwardly towards the top of the container.

11. A reverse flow cyclone separator according to claim 1, wherein a lower end of the shroud meets the member at the same point as the barrier.

12. A reverse flow cyclone separator according to claim 1, wherein the member extends throughout the container.

13. A domestic vacuum cleaner comprising a reverse flow cyclone separator, including:

a container closed at one end;

an inlet for introducing a fluid mixture swirling about an axis at a region of the container remote from the end;

an outlet for lighter phase of the mixture, the outlet opening from the region;

a member mounted centrally within the container, the member being closed off from fluid communication with the container; and a barrier mounted around the member and in a fluid flow path between the region and the closed end, the barrier having a surface facing the inlet and extending towards the outer wall of the container leaving a gap therebetween, and having an outer perimeter which extends in the axial direction a distance not less than the radial extent of the gap;

wherein the outlet comprises a chamber formed by the member, the width of the chamber increasing with distance from the barrier, the arrangement being such that in use fluid flows with substantially constant velocity in the chamber.

14. A method of separating gasses, liquids or solids of different density, or combinations thereof, comprising introducing them as a swirling mixture to the reverse flow cyclone separator including:

a container closed at one end;

an inlet for introducing a fluid mixture swirling about an axis at a region of the container remote from the end; an outlet for lighter phase of the mixture, the outlet opening from the region;

a member mounted centrally within the container, the member being closed off from fluid communication with the container; and a barrier mounted around the member and in a fluid flow path between the region and the closed end, the barrier having a surface facing the inlet and extending towards the outer wall of the container leaving a gap therebetween, and having an outer perimeter which extends in the axial direction a distance not less than the radial extent of the gap;

wherein the outlet comprises a chamber formed by the member and a foraminated shroud mounted around the member, the width of the chamber increasing with distance from the barrier, the arrangement being such that in use fluid flows with substantially constant velocity in the chamber.

15. A domestic vacuum cleaner including a cyclone separator for separating household dust and debris from air, comprising a container closed at one end, an inlet for introducing a fluid mixture swirling about an axis at a region of the container remote from the end, a barrier between the region and the end, the barrier having a surface facing the inlet and extending towards the outer wall of the container leaving a gap therebetween, and an outlet for lighter phase of the mixture, the outlet opening from the region, and the radial extent of the gap being substantially equal to or less than the distance that the outer perimeter of the barrier extends in the axial direction, the distance being 40 mm or less.

16. A domestic vacuum cleaner according to claim 15, wherein the barrier has a solid outer perimeter which is continuous in the axial direction.

17. A domestic vacuum cleaner according to claim 15, wherein the barrier comprises a plurality of separated barriers spanning an axial distance not less than the radial extent of the gap.

18. A domestic vacuum cleaner according to claim 15 wherein the barrier is mounted on a member mounted centrally within the container, the member being closed off from fluid communication with the container.

19. A domestic vacuum cleaner as claimed in claim 18, wherein the member extends throughout the container.

20. A domestic vacuum cleaner as claimed in claim 18, wherein the member is hollow and is connected to receive relatively heavier phase components from a further separator connected to the outlet.

21. A domestic vacuum cleaner according to claim 18, wherein the member has a radius less than 10% of the radius of the container, when the latter is of circular cross-section.

22. A domestic vacuum cleaner according to claim 18, wherein the outlet comprises a chamber formed between the member and a shroud mounted around the member, the width of the chamber increasing with distance from the barrier, the arrangement being such that in use fluid flows with substantially constant velocity in the chamber.

23. A domestic vacuum cleaner claim 22, wherein the shroud is frusto-conical.

24. A domestic vacuum cleaner according to claims 22, wherein a lower end of the shroud has the same radius as the member and tapers outwardly towards the top of the container.

25. A domestic vacuum cleaner according to claim 22, wherein a lower end of the shroud meets the member at the same point as the barrier.

26. A domestic vacuum cleaner according to claim 22, wherein the axial length of the shroud is between 50% and 150% of the outer diameter of the outlet for lighter phase of the mixture.

27. A domestic vacuum cleaner according to claim 22, wherein the shroud has a clear area of between 30% and 70% of its surface area.

28. A domestic vacuum cleaner according to claim 15, comprising a further barrier adjacent the bottom end of the container extending generally in the axial direction.

29. A domestic vacuum cleaner according to claim 28, wherein the further barrier comprises two or more spaced apart walls, the walls being spaced apart from an edge of the container.

30. A domestic vacuum cleaner according to claim 15, wherein a lower portion of the container is removable from an upper portion, the split being about a plane below the barrier.

31. A method of separating gases, liquids or solids of different density, or combinations thereof, comprising introducing them as a swirling mixture to a domestic vacuum cleaner, including a cyclone separator for separating household dust and debris from air, comprising a container closed at one end, an inlet for introducing a fluid mixture swirling about an axis at a region of the container remote from the end, a barrier between the region and the end, the barrier having a surface facing the inlet and extending towards the outer wall of the container leaving a gap therebetween, and an outlet for lighter phase of the mixture, the outlet opening from the region, and the radial extent of the gap being substantially equal to or less than the distance that the outer perimeter of the barrier extends in the axial direction, the distance being 40 mm or less.

32. A domestic vacuum cleaner including a cyclone separator for separating household dust and debris from air, including a container for collecting dust and debris at a lower end thereof, an inlet for introducing a fluid mixture swirling about an axis at a region of the container remote from the lower end, a barrier between the region and the lower end, and an outlet for lighter phase of the mixture, the outlet opening from the region, wherein a lower portion of the container is dividable from an upper portion to allow emptying of the container of collected dust and debris, the lower portion being below the barrier, wherein the barrier is mounted on a member mounted centrally within the container, the member being closed off from fluid communication with the container, and wherein the member is hollow and is connected to receive relatively heavier phase components from a further separator connected to the outlet.

33. A domestic vacuum cleaner according to claim 32, wherein the barrier has a solid outer perimeter which is continuous in the axial direction.

34. A domestic vacuum cleaner as claimed in claim 32, wherein the member extends throughout the container.

35. A domestic vacuum cleaner according to claim 32, comprising a further barrier extending generally in the axial direction.

36. A domestic vacuum cleaner according to claim 35, wherein the axial extent of the further barrier is at least 10% of the diameter of the container at its closed end.

37. A domestic vacuum cleaner according to claim 35, wherein the further barrier comprises two or more spaced apart walls, the walls being spaced apart from an edge of the container.

38. A domestic vacuum cleaner according to claim 32, wherein the gap between the wall of the container and the outer barrier is between 5 and 25% of the diameter of the container at its closed end.

39. A domestic vacuum cleaner comprising a reverse flow cyclone according to claim 32, wherein the member has a radius no more than 50% of the radius of the container, when the latter is of circular cross-section.

40. A domestic vacuum cleaner according to claim 32, wherein a split between the lower portion of the container and the upper portion is about a plane below the barrier.

41. A domestic vacuum cleaner according to claim 32, wherein a split between the lower portion of the container and the upper portion is about a plane at the level of the bottom of the barrier.

42. A domestic vacuum cleaner according to claim 32, wherein a split between the lower portion of the container and the upper portion is about a plane intersecting the barrier.

43. A domestic vacuum cleaner according to claim 32, and wherein the axial length of a shroud is between 50% and 150% of the outer diameter of the outlet for lighter phase of the mixture.

44. A domestic vacuum cleaner according to claim 43, wherein the shroud has a clear area of between 30% and 70% of its surface area.

45. A method of separating gases, liquids or solids of different density, or combinations thereof, comprising introducing them as a swirling mixture to the domestic vacuum cleaner; including:

a container for collecting dust and debris at a lower end thereof, an inlet for introducing a fluid mixture swirling about an axis at a region of the container remote from the lower end, a barrier between the region and the lower end, and an outlet for lighter phase of the mixture, the outlet opening from the region, wherein a lower portion of the container is dividable from an upper portion to allow emptying of the container of collected dust and debris, the lower portion being below the barrier, wherein the barrier is mounted on a member mounted centrally within the container, the member being closed off from fluid communication with the container, and wherein the member is hollow and is connected to receive relatively heavier phase components from a further separator connected to the outlet.

* * * * *